United States Patent [19]

Abramson

[11] 4,326,287
[45] Apr. 20, 1982

[54] TWO WIRE BI-DIRECTIONAL DIGITAL TELEPHONE LINK

[75] Inventor: Paul Abramson, Raleigh, N.C.

[73] Assignee: International Business Machines Corp., Armonk, N.Y.

[21] Appl. No.: 164,452

[22] Filed: Jun. 30, 1980

[51] Int. Cl.³ .............................................. H04L 5/14
[52] U.S. Cl. ......................................... 370/29; 375/36
[58] Field of Search ....................... 370/24, 27, 28, 29, 370/103; 375/36, 107, 109

[56] References Cited

U.S. PATENT DOCUMENTS

| | | | |
|---|---|---|---|
| 3,339,022 | 8/1967 | Abramson | 178/69 |
| 3,721,763 | 3/1973 | Homan | 370/29 |
| 4,012,590 | 3/1977 | Haass | 370/28 |
| 4,084,069 | 4/1978 | Looschen | 375/36 |
| 4,112,253 | 9/1978 | Wilhelm | 370/27 |
| 4,117,277 | 9/1978 | van den Elzen | 370/27 |
| 4,253,181 | 2/1981 | Watten | 370/103 |

FOREIGN PATENT DOCUMENTS 1401436 7/1975 United Kingdom .

OTHER PUBLICATIONS

The TSTA-1 Telephone Equipment for a Digital Communication Network by Abugov et al., *Telecommunications and Radio Engineering*, vol. 33—34, Nov. 1979, pp. 27-30.

*Primary Examiner*—Howard Britton
*Attorney, Agent, or Firm*—Edward H. Duffield

[57] ABSTRACT

This invention details a baseband bipolar pulse signaling technique employing only two wires for simultaneous bi-directional communications. A first polarity of pulses is utilized for communication of traffic in one direction; traffic in the return direction utilizes pulses of the opposite polarity. Each end of the communication link has both a sender and a receiver. One sender arbitrarily transmits only positive pulses; the receiver at this end of the system will recognize only negative pulses. The inverse set of conditions is enforced at the opposite end of the link. Means are included for synchronizing the application of pulses to the link at the other end in response to the receipt of pulses at that end to avoid overlap of receive pulses at the originating end of the line.

6 Claims, 6 Drawing Figures

TWO WIRE BI-DIRECTIONAL DIGITAL TELEPHONE LINK

BACKGROND OF THE INVENTION

The present invention relates generally to signal transmission systems and particularly to pulse transmission systems employed in telephone communications technology, currently termed digital telephone communication.

Prior Art

A great variety of digital communication systems and schemes exist. One such scheme under current industry consideration for bi-directional digital telephone communication utilizes 8,000 samples of incoming signal per second. Eight bits of digital information are extracted for each sample or frame which yields a basic 64 kilobit per second transmission rate. Two additional bits per frame are specified for controlling and signaling purposes which make a grand total of 10 bits per frame and an 80 kilobit per second transmission rate. The 80 kilobit per second transmission is required for each direction since, in a telephone system, both talking and listening are simultaneous. The general approach to this situation in the prior art has been known as a four-wire connection with one pair of wires carrying an outgoing 80 kilobit per second data signal and the other pair carrying an incoming 80 kilobit per second data signal. This presents a significant problem, for most telephone instruments today are analog devices. These transmit and receive analog signals and are connected to one another and to the external systems over a single pair of wires. Inside of the telephone itself, a device known as a hybrid circuit separates the analog signal to connect them respectively to the microphone and ear phone. If such telephones are to be converted to digital telephone use (i.e., those in which the voice signal is digitized for transmission and reception) some method must be found for transmitting and receiving the 80 kilobit per second data signals simultaneously over a single pair of wires as used by the existing telephone wiring. Rewiring of existing facilities to convert from two wire to four wire circuits would be extremely time consuming and expensive. This invention describes a means and method by which the system can transmit and receive 80 kilobit per second data signals over a single pair of wires simultaneously so that normal telephone conversations can be carried on as well as digital two-way data exchange.

U.S. Pat. No. 3,721,763 illustrates some of the prior art in this area. Two separate unipolar transmitters which transmit pulses of the same polarity are utilized with a two-wire connecting system. Inverting transformers are interposed between the transmitter and the receiver at each end so that the received pulses are inverted for recognition and to avoid interference with positive pulses being simultaneously transmitted at the same end. However, a ground connection is also shown and can be inferred as being a three-wire connection between the transmitter and receiver and this ground connection introduces the possibility of ground loop interference which is most undesirable.

Other illustrative patents showing two-wire simultaneous bi-directional communication are U.S. Pat. Nos. 4,012,590, 4,112,253 and 4,117,277. These patents show alternative approaches to the basic problem but utilize other communication techniques in which the current or voltage levels are compared or differentiated or in which special encoding and decoding operations are conducted to accommodate the bi-directional simultaneous communication. These systems and techniques are generally more complex and expensive than the currently contemplated one as will be readily appreciated by those of skill in the art.

Objects

In view of the foregoing difficulties of expense and complexity in the known prior art systems contemplated for a similar purpose to the present invention, it is the object of the present invention to provide an improved two-wire digital data communications system compatible with normal telephone installations in existence and which does not require a ground connection from station to station.

A further object of the present invention is to provide an improved communication technique.

Summary

The foregoing and still other unenumerated objects of the present invention are met by providing at opposite ends of a two-wire communication link, at least two stations. Each of the stations has both a sender and a receiver. One of the senders is selected to transmit only positive pulses and the receiver located at this station is selected to recognize only negative pulses. An inverse situation is enforced at the opposite end of the communication link. Means are further included for synchronizing the application of return pulses in response to the receipt of pulses from the opposite end so that the pulses returned will not overlap with those being transmitted when they are sensed at the receiver. A phase locked loop at each receiver extracts the clocking information from the transmitted signals for synchronizing the return transmission to avoid overlap of the pulses and for determining whether a received bit is a 1 or a 0. Means are also provided for extracting framing information for determining the significance of the detected bits.

DETAILED SPECIFICATION

Figure 1:
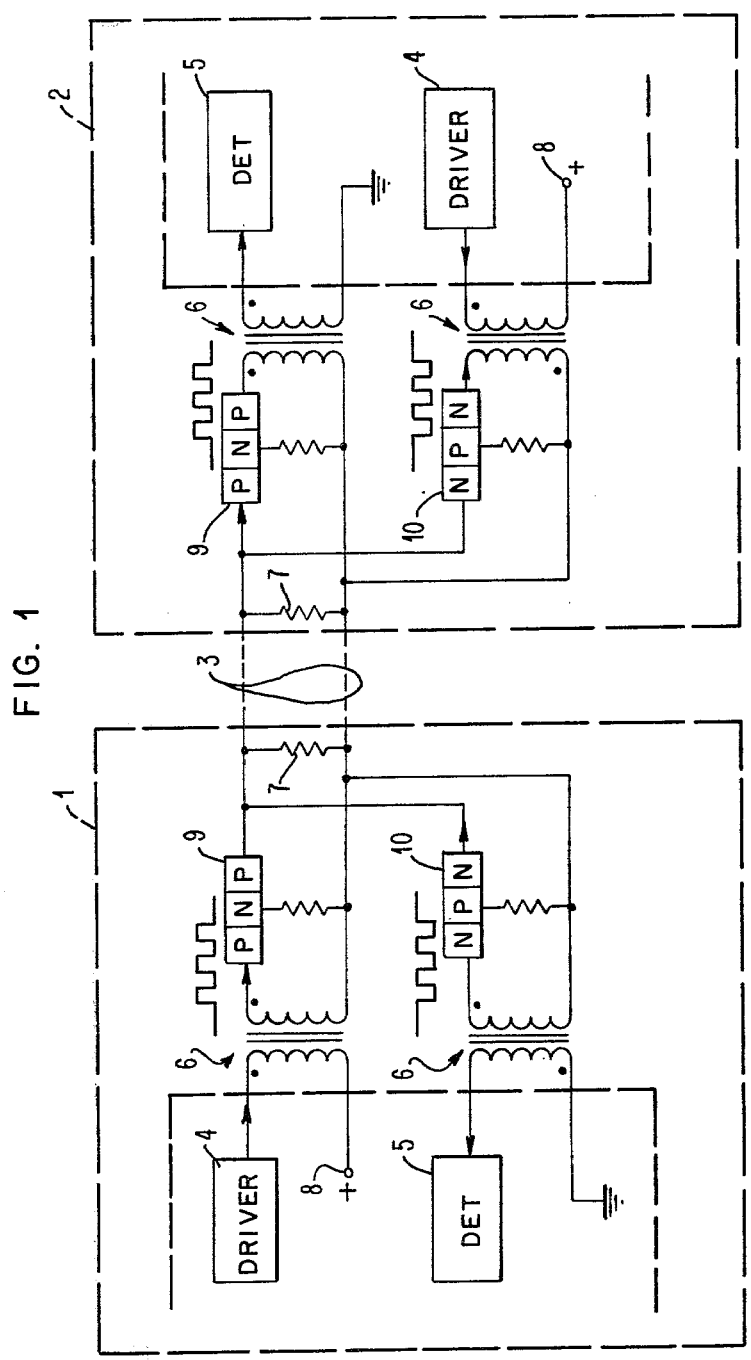
FIG. 1 is a schematic diagram of a preferred embodiment of the overall system and its method and apparatus for a preferred embodiment of the present invention.

Turning to FIG. 1, the overall block schematic diagram of a communications system employing the method and apparatus of the preferred embodiment of the present invention is briefly shown. Station 1 and station 2 are connected to one another by a two-wire communication line 3. Both stations have a transmitter or driver 4 and a detector or receiver 5 connected as shown to the communication link 3 via transformers 6. It is to be noted that inverted polarity transformers are utilized for one of the driver receiver pairs connected by communication link 3. A terminating resistor 7 appears at each end of the communication line 3 at the input/output connection for each station 1 and 2. A single positive power supply 8 is indicated for each station 1 and 2. The detector and driver circuits 5 and 4 respectively, are shown in greater detail later.

Figure 2:
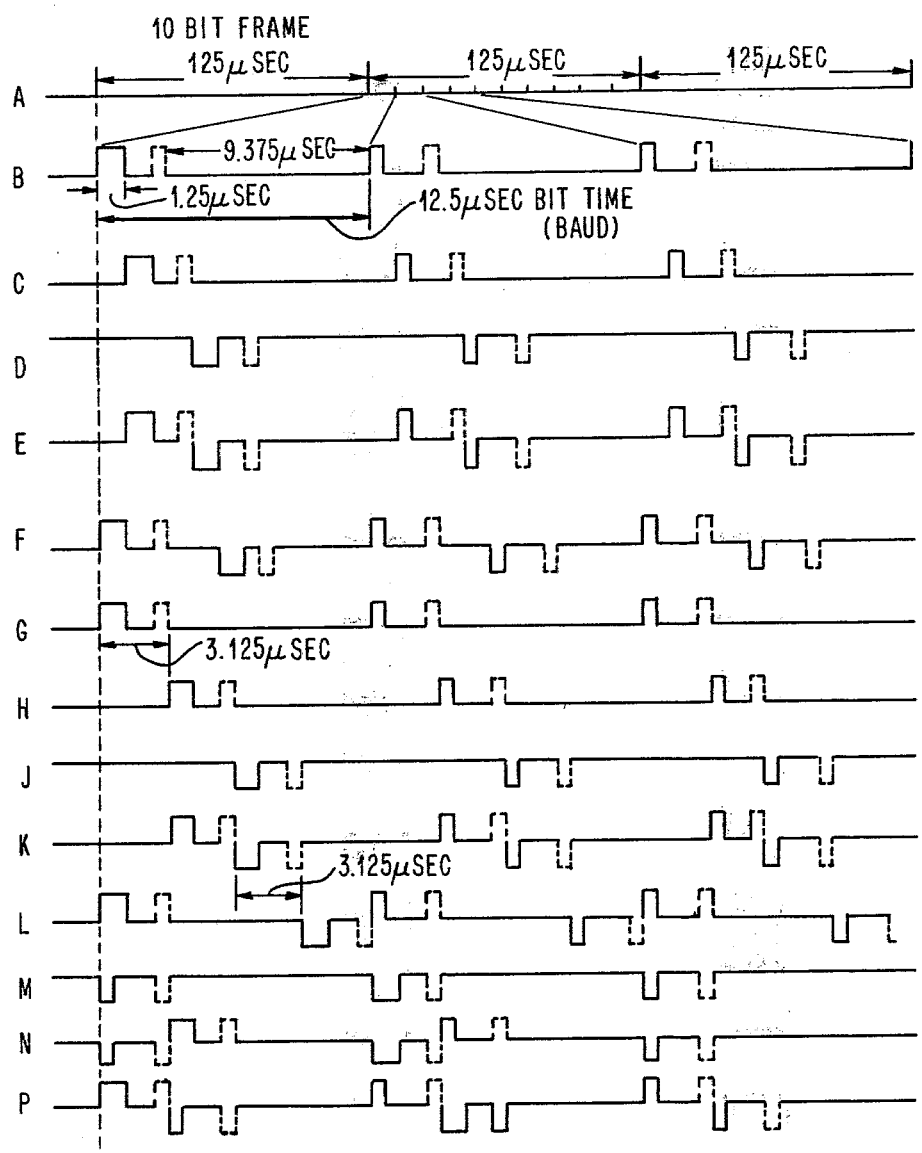
FIG. 2 is an illustrative pulse timing chart for describing the method of the present invention.

Turning to FIG. 2, the overall scheme of transmission in the present system is described with relationship to the timing charts showing the framing and synchronization of the transmission and receive operations.

In FIG. 2, an 80 kilobit per second transmission system is described which is divided into 8,000 frames per second with 10 bits in each frame. Each frame thus comprises 125 microseconds and each bit is 12.5 microseconds in duration. Each bit time of 12.5 microseconds is further subdivided into 10 segments of 1.25 microseconds each. The basic system clock rate for generating these divisions is thus 800 kilohertz. Line A of FIG. 2 shows the basic frame rate of an 8 kilohertz framing of 125 microseconds per frame. Line B shows the details of the first three bits of 12.5 microseconds each on an expanded scale.

It will be noted in line B that each bit includes at least one pulse at the start of the baud or bit time and may include another pulse located at the third subdivision or time slot within the baud. This secondary pulse, when employed, occupies 0.625 microseconds so it is $\frac{1}{2}$ of a time slot in width. There is always at least one pulse at the start of each baud to facilitate the extraction of the basic 800 kilohertz clock signal at each receiver. The clock extraction is done by means of a phase locked loop circuit described in detail later. Additionally, the first pulse at the start of each baud occupies a full 1.25 microsecond time slot so that it is twice as wide as any secondary data pulse within the baud. The secondary pulse is the data pulse and its presence gives meaning to the content of the baud. The wide pulse at the start of each baud in a frame indicates the start of frame synchronization and also indicates that the most significant bit of a 10 bit word follows it.

The pulses applied to the transmission line 3 of FIG. 1 will be delayed due to the basic transmission delay in the system and because a pair of wires are normally twisted to reduce outside interference. The time delay involved for a pulse propagation on a twisted wire pair is approximately 5 microseconds per kilometer. Line C of FIG. 2 illustrates the effect on the pulse delay after approximately 750 feet of twisted wire has been traversed. The pulses are idealized and the effects of resistance, conductance and capacitance which would distort the pulse shape are ignored for this discussion.

In Line C, the pulses which were assumed to be transmitted at the timing shown in Line B, are showed delayed in time being received after approximately 750 feet of propagation on the twisted two-wire line. At this point in the system, the clocking and frame synchronization signals would be extracted and any return data would be encoded. Line D illustrates the pulse train at the receiver which would be transmitted back to the originating station. In line D, the returning pulses are timed for transmission with respect to the incoming pulse train to be sent following receipt of the secondary pulse in each baud (if present). The return signals are negative pulses. It is important to note that positive pulses for transmission in one direction and negative pulses for transmission in the other lie at the heart of this scheme. The composite signal on the wire at the receiver which is then going to respond to the original station therefor looks like that in Line E of FIG. 2.

Line F of FIG. 2 shows the wave train as it would appear as received at the original transmitter. This is a combination of the positive pulse trains of line B combined with the negative pulse train of line D with the pulses from line D delayed by the same amount as those in line C of the positive nature. It may be seen that the delay between sending of positive pulses and the return of negative pulses will be twice the delay of the transmission link.

It is apparent from the discussion that if a pulse train of line F is viewed, that the longer the wire linking of the two stations together becomes, the longer the delays will be and that at some length a returned negative pulse will interfere at the originating transmitter with the sending of positive pulses since they will overlap in time.

To illustrate this notion, FIG. 2, line G shows the same transmitted pulse train as line B and line H shows the effect of assuming a longer wire connecting the two stations so that the pulses will be delayed by 3.125 microseconds. Line J shows negative pulses being returned following the receipt of delayed pulses on line H. Line K shows the composite pulse train as it would be seen at the original receiver and line L shows the composite as it would appear at the original transmitter including the additional delay for the return of negative pulses. It is well to note that the return pulses just barely miss interfering with positive pulses being transmitted. Thus, if the communication link between the two stations were any longer or their propagation delay any greater, negative pulses would interfere in part with the transmission of positive pulses and would render one or the other or both undetectable at their respective receivers.

A delay of approximately 3.125 microseconds in propagation time represents a length of transmission wire of about 2,000 ft. Hence, given the scheme described so far with the timing of the return pulses following the receipt of incoming ones, a transmission length of approximately 2,000 feet is maximum. Any length of wire that results in a transmission delay of more than 3.125 microseconds would cause some interference at the transmission end in the example given. There is no specific problem at the receiver end in this example since negative pulses can be placed anywhere in the baud following the receipt or prior to the receipt of positive pulses. A solution to the problem which permits wire of theoretically unlimited length is described in lines M through P of FIG. 2.

Line M shows a negative pulse train equivalent to that shown in line J except for the fact that the pulse train in line M is assumed to be sent at the end of the baud rather than immediately after the receipt of positive pulses which were described in line K. A new composite at the receiver end is shown in line N. The positive pulses still arrive as shown in lines H and K. Now adding the delay of the line for the negative pulses, the composite pulse train appearing at the original transmitter is shown in line P. In line P, it can be seen that the return negative pulses also just barely miss interfering with the transmitted positive pulses, but this time the negative pusles appear after the positive pulses. Therefore, any greater delay will further separate the pulses and avoid interference.

Comparing the pulse train in line P with that in line L, it can be seen that both pulse trains just barely miss interfering with the transmitted pulses. But it is apparent that the pulse train of line L would interfere if the wire were longer and the pulse train of line P would interfere if the wire were shorter. Since a wire length which produces a delay of 3.125 microseconds permits either pulse position for timing the return negative pulses to be acceptably received, it is obvious for any length of wire, one of the two pulse timing positions for transmission of negative pulses will be satisfactory and will not interfere with the originating positive pulses. Thus, any length of wire can be accommodated in this scheme by an appropriate selection of the timing point for returned negative pulses relative to the incoming positive pulses or to the beginning or end of a baud time.

Returning to FIG. 1, the basic scheme described in FIG. 2 can be further described. As noted above, the basic scheme consists of transmitting positive pulses from one facility, conveniently called a central facility but obviously capable of being a single station, and of transmitting negative pulses from remote terminals or telephones, each pair being connected on a two-way path consisting of one twisted pair of wires.

Starting with the positive pulses generated in station 1 of FIG. 1, a driver circuit 4 drives pulses into the primary circuit of a pulse transformer 6. The secondary of transformer 6 is connected to the communication link through a PNP transistor. Thus, when a positive pulse appears at the output of driver 4 in station 1, it causes a base emitter current to flow, thus turning on the entire transistor 9.

Positive pulses will therefore appear across communication line 3 and the terminating resistor 7 (typically a 100 ohm resistance) at the other end of the communication link 3 another terminating resistor 7 with another PNP transistor 9 connected to the transformer winding for transformer 6 as shown. As on the transmission station 1 end, positive pulses go through PNP transistor 9 and are picked up by the other winding of transformer 6. This winding has one end grounded and one end connected to a signal detector circuit for detecting positive pulses. The signal detector circuit 5 amplifies and squares the signal received since it will be received in a distorted condition due to resistance, capacitance and inductance effects in the communication link 3. The signal is then presented to the phase locked loop and other circuitry not shown in FIG. 1 for data and clock extraction.

At the receiving station 2 the logic (not shown) is used to generate a return signal if any is to be presented which is generated by operating driver 4 connected to another pulse transformer 6. As the dots on the windings of pulse transformer 6 at station 2 connected to driver 4 show, the pulses are inverted and become negative pulses. The negative pulse is passed through an NPN transistor 10 onto the communication link 3 through the terminating resistor 7. Negative pulses cannot re-enter the detector circuit at station 2 because of the action of the PNP transistor 9. Incoming positive pulses from the transmission station 1 cannot enter into driver 4 at station 2 due to the action of the NPN transistor 10.

Similarly, at the transmission end, incoming negative pulses pass through NPN transistor 10 into detector 5 through the pulse transformer 6. The pulse transformer 6 by its dot positions shows a re-inversion of the pulses so that detector 5 can be of the same form as that in the receiver station 2. Positive pulses are prevented from entering the detector circuit 5 by action of the NPN transistor 10 as with the receive station 2.

It is well to note that through the use of the transformer 6, the actual transmission wires 3 are never connected to either the local ground or the power supply. This provides several distinct advantages. First, there is no ground connection common to the transmitter and receiver stations 1 and 2 so there is no ground loop interference presented and a true two-wire system exists. Secondly, common mode noise is effectively eliminated by the use of the transformers and twisted pair communication wires. Thirdly, the transformer inverting function permits the generation and detection of negative pulses using only a single positive power supply at each end of the transmission line.

Applying this scheme to the overall system envisioned for use, the following overall system would exist. A central facility transmitting positive pulses over a twisted pair of wires to a receiver would be employed. The receiver would detect positive pulses, extract clocking and frame information (after appropriate wave shaping and squaring of received distorted pulses) and will extract any data present and the data and synchronization information so derived will be passed to a user facility. The clocking information derived at the receiver is used for encoding data if any to be returned. The return data is in the form of negative pulses placed on the same pair of wires for transmission back to the central facility. At the central facility, negative pulses are detected, decoded (after appropriate wave shaping, etc.) and passed on in similar fashion to another user facility. Thus, it may be seen that either a central communication facility communicating with single stations or a central station handling communications between multiple remote signal stations can be constructed. If two remote facilities such as telephones wish to communicate with each other, they each transmit negative pulses to a central facility which connects them together, for example, by a time division multiplex arrangement so that they communicate respectively to each other via the interface of positive pulses generated at the central station.

Figure 3:
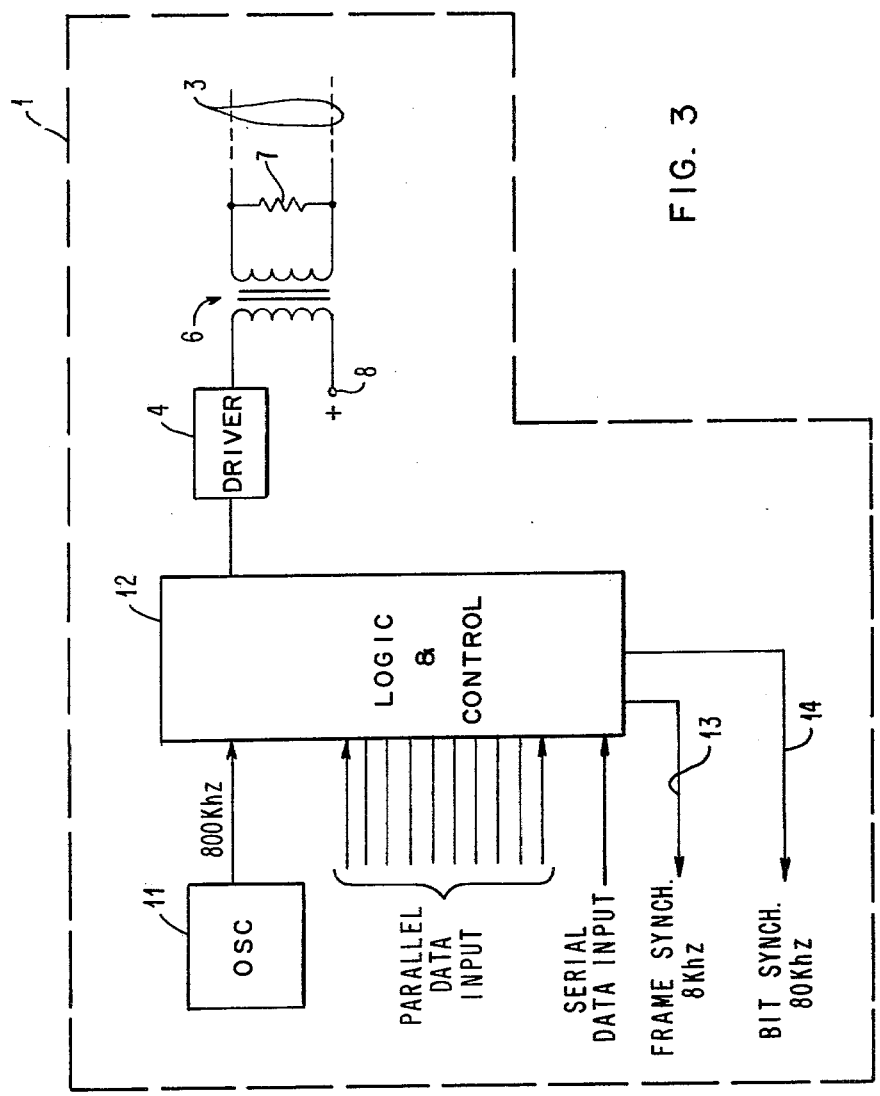
FIG. 3 is a simplified schematic block diagram of a central exchange facility employing the techniques of the present invention.

FIG. 3 is a simplified block schematic diagram of a central facility or transmission station 1. Basically the transmitter section of the system is shown in FIG. 3. It is assumed that the transmitter obtains data from some source and encodes it into the format shown in FIG. 2. In FIG. 3, the basic elements of the transmitter include a crystal oscillator 11 producing a basic 800 kilohertz signal. This basic frequency would be used by all of the transmitters at the central facility or PBX. It is also shown in a section in FIG. 3 labeled Logic and Control Block 12. This is intended to encode data into the format shown in FIG. 2. It produces an output to driver 4, a frame synchronization pulse train of 8 kilohertz on an output 13 and a bit synchronization output 14 operating at 80 kilohertz. The output of driver 4 is connected through transmformer 6 to modulate power from supply 8 onto the transmission line 3 as previously described. Because the logic and control circuitry for receiving either parallel or serial input data and for the 800 kilohertz clocking frequency is well known and available and does not form a specific element of novelty in the present invention, it is not described further herein.

The encoding function is described in FIG. 2 from which it is obvious to those of ordinary skill in the art how the gating and timing for controlling driver 4 are to be synchronized with the frame synchronization signals and bit synchronization signals derived by counting down the basic 800 kilohertz input.

Figure 4:
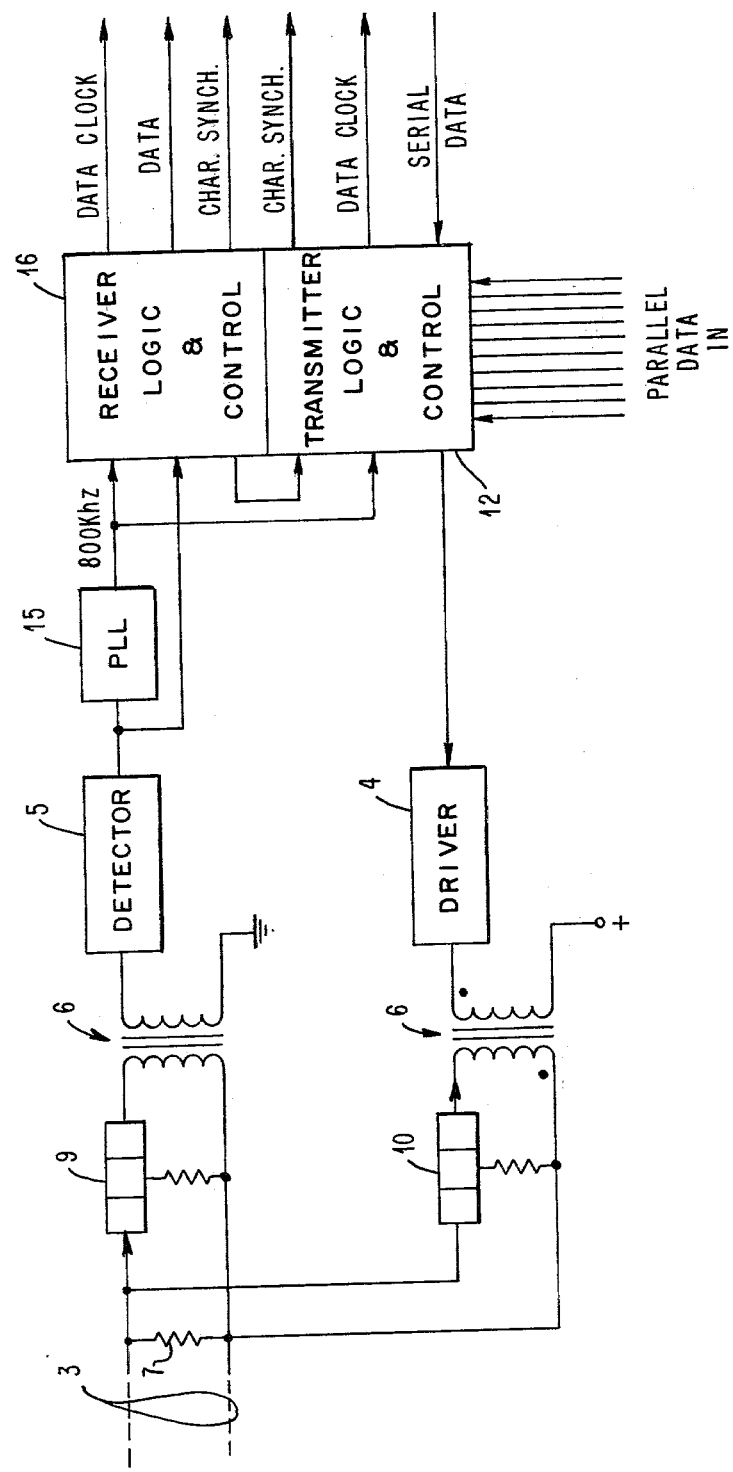
FIG. 4 is a schematic block diagram of a remote receiver employing the techniques of the present invention.

Turning to FIG. 4, the overall schematic for a receiver station 2 as shown in FIG. 1 is illustrated in greater detail. Positive incoming pulses pass through the PNP transistor 9 and transformer 6 to detector 5. In detector 5, the incoming pulses will be amplified and squared to remove the effects of distortion previously noted. These pulses are then applied to a phase locked loop circuit 15 to extract the 800 kilohertz clock frequency in phase with received pulses. The phase locked loop operation is facilitated by the fact that each baud has at least one pulse at the start thereof and that each frame has a wide pulse at the start of the first baud as previously described. Other pulses within each pulse may be data pulses occurring at the third time slot within the baud and their presence or absence may be indicative of the presence of data. By means of simple logic, the data and character synchronization pulses as well as the data clocking function are extracted from the incoming signals and presented to an external time division multiplex circuit or other similar apparatus for use at the receiver station. The character synchronization pulse, i.e., the frame synch pulse is identified in the logic because it has a width of twice the other pulses and occurs at the start of each frame at the start of the first baud therein.

Using this same extracted 800 kilohertz clocking frequency, a transmitter similar to that shown in FIG. 3 and having the same transmitter logic and control 12 as that shown in FIG. 3 may be employed. By means of the inverting transformer 6, the driver 4 connected to the transmitter logic and control 12 at the receiver station 2 illustrated in FIG. 4, negative pulses are placed on the communications line 3 for the return trip to the central station indicated in FIG. 1. It should be understood that at the central station 1 in FIG. 1, there would be placed another receiver next to the transmitter shown in FIG. 3 which is a duplicate receiver with its own phase locked loop to extract the 800 kilohertz clock required to detect any returning negative pulses. The receiver at the central station is the same as that shown in FIG. 4 and it should be noted that at the central station, the basic central station 800 kilohertz crystal clock frequency cannot be used for detection since, for extracting clocking information, the clock used must be in phase synchronization with the return data in order for detection to be performed. Due to the variable delay of different line lengths between stations, the central station cannot count upon the crystal clock at its site being in phase synchronization with any return pulses thus a separate phase locked loop clock circuit must be provided for each line connected to each remote terminal.

Figure 5A:
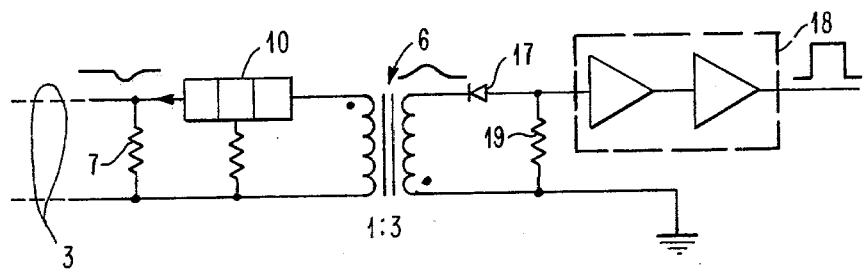
FIGS. 5A and 5B are schematic block diagrams for the negative and positive pulse generation circuits employed in the preferred embodiment of the present invention.
Figure 5B:
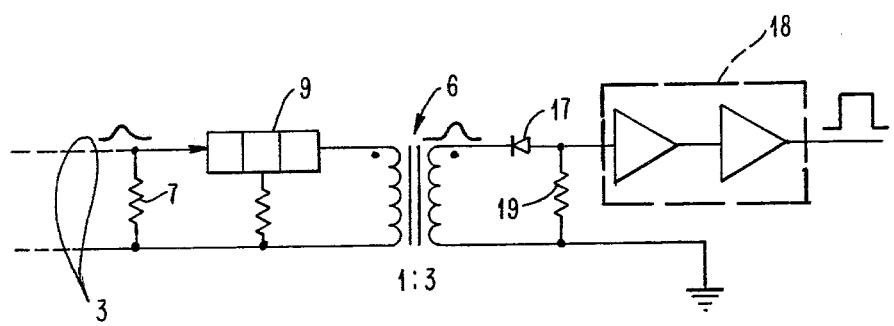

As was noted earlier, the various received pulses at the end of long lengths of wire will be attenuated and distorted. As a result, some means is necessary to reconstruct and extract clean square edged pulses. Simple circuits for doing this have been devised and much more elaborate ones exist as will be understood by those of skill in the art. However, for purposes of demonstrating the preferred embodiment of the present invention, simple detector circuits were designed as shown in FIGS. 5A and 5B, for detecting negative pulses and positive pulses, respectively. The transformers 6 used in these circuits have a one to three turn ratio step up resulting in a positive pulse of about 2 volts at the secondary in FIGS. 5A and 5B. (The primary is connected to the transmission line 3.) A 2 volt input level is sufficient to open the diode 17 to cause the TTL inverter which may be a type 7404 module to change level cleanly to reconstruct an output pulse as shown. Before arrival of an incoming pulse, the TTL inverter 18 is held at ground through the diode 17 grounding through the coil of transformer 6. The 1K resistor 19 acts as a threshold setting means for the TTL inverter 18.

FIG. 5A is the detector circuit for negative pulses while FIG. 5B shows the detector for positive pulses, the only difference being the transistors 9 and 10 and the inverting connection of one of the transformers 6 in the case of the negative detector circuit. The circuitry shown in FIGS. 5A and 5B is satisfactory for operation, but further refinement for high accuracy data transmission and detection would be desirable as will be understood by those skilled in the art.

The system as described above with regard to the preferred embodiment has been constructed and tested with a multi-million bit transmission and reception test without error over a 4,000 foot wire. Thus, the feasibility of the basic concept of multiplexing pulses of different polarity traveling in two directions over the same pair of wires has been demonstrated. A range of at least 4,000 feet is clearly attainable and, with a better pulse detector circuit, an indefinite increase is possible especially with the use of intermediate repeaters.

Having thus described my invention with reference to a preferred embodiment thereof, what I claim and desire to protect by Letters Patent is:

1. A bi-directional communications system for simultaneous communication over a two-wire link comprising:
   at least a first station and a second station, said stations each comprising a transmitter and a receiver connected to said two-wire link;
   said transmitter at said first station being capable of producing pulses of a first polarity for application to said link;
   said receiver at said first station being responsive to pulses of the opposite polarity to those transmitted by said transmitter at said first station;
   said second station having a receiver responsive to pulses of the polarity transmitted by said transmitter at said first station and having a transmitter for producing pulses of the opposite polarity thereto for application to said link;
   said transmitters at said first and second stations being synchronized with respect to the receipt of pulses of the polarity to which the respective receivers are responsive for applying outgoing pulses to said link at a position within the baud defined by a given transmission rate such that said pulses when delayed by the propagation delay of said link will not arrive coincident with the generation of the pulses at the opposite ends of said link.

2. A system as described in claim 1, and further comprising:
   a plurality of said second stations, each being connected by a separate said two-wire link to said first station and communicating thereto by means of pulses of like polarity and receiving therefrom communications via pulses of the opposite polarity thereto.

3. A bipolar pulse communications apparatus adapted for communication over a two-wire link in a communications system, comprising:

a transmitter for generating pulse coded data formatted in pulses of a first given polarity and a power supply for supplying electrical energy of said polarity to be modulated by said transmitter;

a transformer having its primary winding connected to said transmitter and its secondary winding connected to a polarity responsive current switch for passing pulses of said polarity to said communication link;

a receiver said receiver being connected to said communication link and having a polarity sensitive switch means for passing pulses of the opposite polarity to those generated by said transmitter, said switch being connected in series with said communication link;

a transformer having a primary and secondary winding, the secondary winding thereof being connected to said switch for passing pulses of opposite polarity to those generated by said transmitter and its primary winding connected in inverse fashion between ground and a positive potential output for supplying inverted output pulses in response and in respect to input pulses supplied to said secondary winding passed by said polarity sensitive switch means; and pulse amplification and shaping means connected to said inverted polarity pulse output of said receiver transformer.

4. Simultaneous bipolar communications apparatus as described in claim 3 and further comprising:

a two-wire communication link connected to said transmitter and receiver at one end thereof and to another pair of said transmitter and receivers at the opposite end thereof;

each said receiver comprising a phase locked loop circuit for deriving a reference frequency from the frequency of said incoming pulses of said polarity to which said receiver is sensitive.

5. A method of communicating bi-directionally and simultaneously over a two-wire communications link, comprising steps of:

transmitting from a first station a unipolar pulse code at said baud rate established for said system and applying said code to said communications link;

receiving said unipolar pulse coded signals at a receiving station connected to said two-wire link;

deriving from said received unipolar pulse code the characteristic baud rate inherent in said transmission and responsive thereto, generating any response or communication to said communication line by a pulse coded unipolar signal of opposite polarity to those received;

said opposite polarity unipolar pulse code pulses being applied to said communication link at a time responsive to the basic communication frequency derived from said incoming transmissions which, taking into account the inherent propagation delay of said communication link, will not interfere with or coincide in time with the original transmissions at the opposite end of said link.

6. A method as described in claim 5 further comprising:

receiving said pulses of opposite polarity from said communication link;

passing said opposite polarity pulses through a polarity responsive switch means connected in series with the secondary winding of an inductive means; and inversely connecting the primary as an output from said inductive means between ground and the detecting means for the reconstruction of pulses of a first polarity.

* * * * *